US012801477B2

(12) United States Patent
Shum et al.

(10) Patent No.: US 12,801,477 B2
(45) Date of Patent: Nov. 17, 2026

(54) PROBLEM ANALYSIS UPDATES TO MACHINES WITHIN A CUSTOMER NETWORK

(71) Applicant: International Business Machines Corporation, Armonk, NY (US)

(72) Inventors: Stephanie Carys Shum, Wappingers Falls, NY (US); Patrick John Clas, Pine Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/679,812

(22) Filed: May 31, 2024

(65) Prior Publication Data

US 2025/0370843 A1 Dec. 4, 2025

(51) Int. Cl.
*G06F 11/07* (2006.01)

(52) U.S. Cl.
CPC ........ *G06F 11/079* (2013.01); *G06F 11/0709* (2013.01); *G06F 11/0793* (2013.01)

(58) Field of Classification Search
CPC . G06F 11/079; G06F 11/0709; G06F 11/0793
See application file for complete search history.

(56) References Cited

U.S. PATENT DOCUMENTS 6,170,065 B1 1/2001 Kobata et al.
6,675,323 B2 1/2004 Bartenstein et al.
6,757,837 B1 6/2004 Platt et al.
7,418,634 B2 * 8/2008 Okuhara ............... G06F 3/1285 714/48
7,668,953 B1 * 2/2010 Sinclair ................... H04L 41/16 709/224
(Continued)

FOREIGN PATENT DOCUMENTS

CN 110096556 A 8/2019
CN 110990831 B 1/2021
(Continued)

OTHER PUBLICATIONS

U.S. Appl. No. 18/499,302, filed Nov. 1, 2023.
(Continued)

*Primary Examiner* — Jigar P Patel
(74) *Attorney, Agent, or Firm* — Edward J. Wixted, III; Blanche E. Schiller, Esq.; Heslin Rothenberg Farley & Mesiti P.C.

(57) ABSTRACT

Techniques relating to problem analysis for computing systems. The techniques include identifying a computing system problem based on an identifier generated at the computing system, and determining that first problem analysis data, relating to the computing system problem and accessible at the computing system, is out of date compared with second problem analysis data, relating to the computing system problem and accessible at a remote server. The techniques further include transmitting the second problem analysis data from the remote server to the computing system. The computing system is configured to use the second problem analysis data to identify a solution to the computing system problem.

20 Claims, 5 Drawing Sheets

(56) References Cited

U.S. PATENT DOCUMENTS

| | | | | |
|---|---|---|---|---|
| 8,214,329 | B2 * | 7/2012 | Gilder | G06F 16/25 707/622 |
| 8,443,226 | B2 | 5/2013 | Samoilova et al. | |
| 8,453,027 | B2 * | 5/2013 | Bartz | G06F 11/079 714/799 |
| 8,855,801 | B2 | 10/2014 | Bagwell et al. | |
| 9,274,927 | B2 | 3/2016 | Ramachandra et al. | |
| 9,425,830 | B2 | 8/2016 | Nakagata | |
| 11,132,250 | B2 * | 9/2021 | Balasubramanian | G06F 11/0721 |
| 2003/0200127 | A1 | 10/2003 | McQueen et al. | |
| 2006/0280204 | A1 | 12/2006 | Nagata et al. | |
| 2008/0209274 | A1 * | 8/2008 | Nicholson | G06F 11/008 714/E11.178 |
| 2009/0326784 | A1 * | 12/2009 | Tanner | G05B 23/0278 701/100 |
| 2010/0131792 | A1 | 5/2010 | Herrod | |
| 2011/0302461 | A1 | 12/2011 | Gertler et al. | |
| 2013/0031086 | A1 | 1/2013 | Strelec et al. | |
| 2016/0132419 | A1 * | 5/2016 | Reichart | G06F 11/3684 714/38.1 |
| 2018/0203755 | A1 | 7/2018 | Das et al. | |
| 2018/0307221 | A1 | 10/2018 | Cline et al. | |
| 2023/0418582 | A1 * | 12/2023 | Nagarajan | G06F 8/65 |

FOREIGN PATENT DOCUMENTS

| | | | |
|---|---|---|---|
| CN | 112035353 | B | 6/2022 |
| CN | 115515124 | A | 12/2022 |
| CN | 113849329 | B | 7/2023 |
| JP | 2014-109790 | A | 6/2014 |

OTHER PUBLICATIONS

U.S. Appl. No. 18/507,196, filed Nov. 13, 2023.

U.S. Appl. No. 18/499,366, filed Nov. 1, 2023.

Shum, et al., "Updating Computing Error Analysis Windows", U.S. Appl. No. 18/661,275, filed Oct. 10, 2024, 33 pages.

* cited by examiner

PROBLEM ANALYSIS UPDATES TO MACHINES WITHIN A CUSTOMER NETWORK

BACKGROUND

The present invention relates to computing systems, and more specifically, to problem analysis for computing systems.

SUMMARY

Embodiments include a method. The method includes identifying a computing system problem based on an identifier generated at the computing system. The method further includes determining that first problem analysis data, relating to the computing system problem and accessible at the computing system, is out of date compared with second problem analysis data, relating to the computing system problem and accessible at a remote server. The method further includes transmitting the second problem analysis data from the remote server to the computing system. The computing system is configured to use the second problem analysis data to identify a solution to the computing system problem.

Embodiments further include a non-transitory computer program product including one or more non-transitory computer readable media containing, in any combination, computer program code that, when executed by operation of any combination of one or more processors, performs operations. The operations include identifying a computing system problem based on an identifier generated at the computing system. The operations further include determining that first problem analysis data, relating to the computing system problem and accessible at the computing system, is out of date compared with second problem analysis data, relating to the computing system problem and accessible at a remote server. The operations further include transmitting the second problem analysis data from the remote server to the computing system. The computing system is configured to use the second problem analysis data to identify a solution to the computing system problem.

Embodiments further include a system, including one or more processors and one or more memories storing a program, which, when executed on any combination of the one or more processors, performs operations. The operations include identifying a computing system problem based on an identifier generated at the computing system. The operations further include determining that first problem analysis data, relating to the computing system problem and accessible at the computing system, is out of date compared with second problem analysis data, relating to the computing system problem and accessible at a remote server. The operations further include transmitting the second problem analysis data from the remote server to the computing system. The computing system is configured to use the second problem analysis data to identify a solution to the computing system problem.

DETAILED DESCRIPTION

Figure 1:
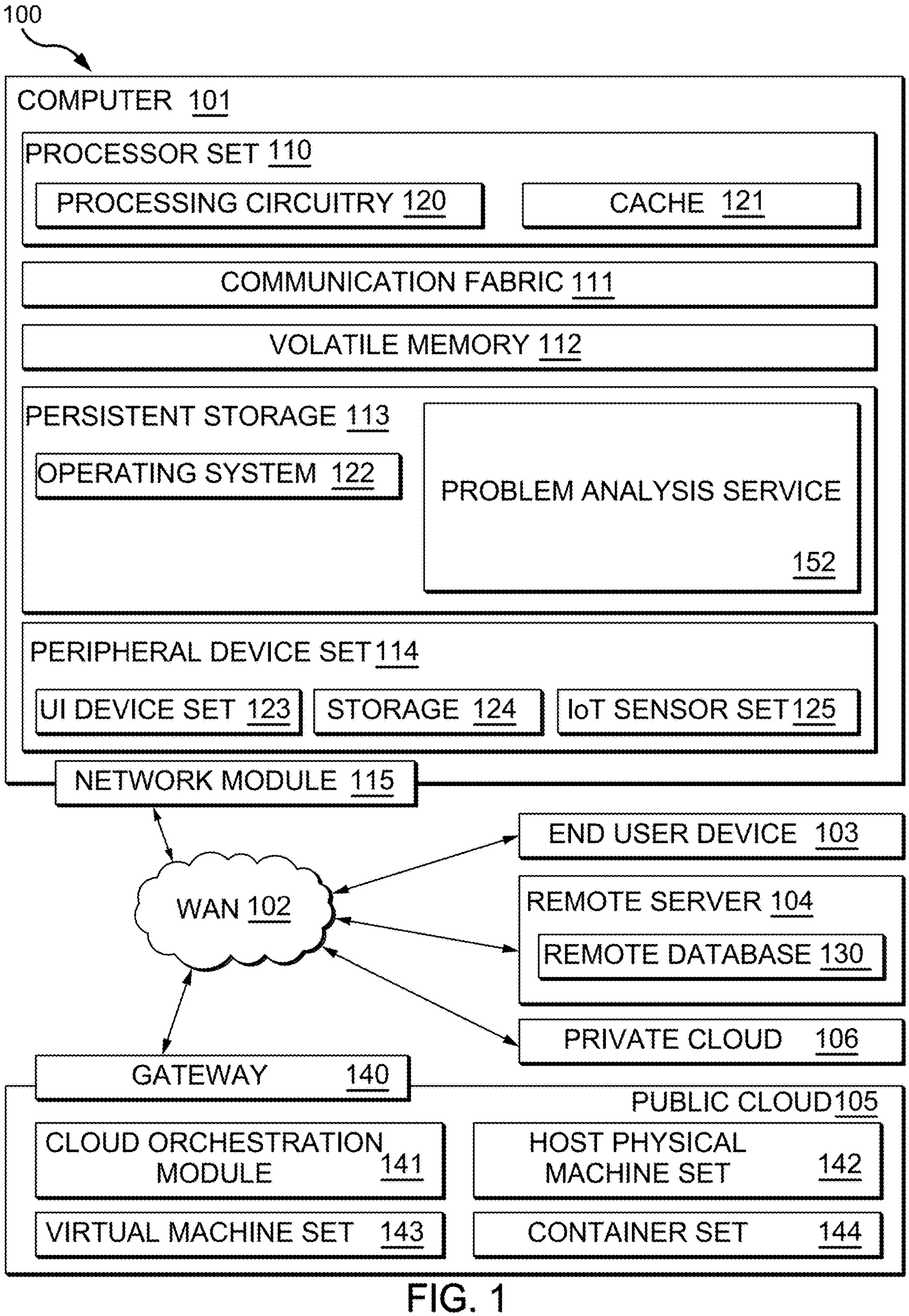
FIG. 1 illustrates a computing environment for problem analysis updates to machines within a computing network, according to one embodiment.

In an embodiment, problem analysis involves methods for analyzing problems on a system (e.g., a computing system). These problem analysis methods can be updated based on human analysis of historical problems, typically requiring a subject matter expert. In addition, problems often generate error identifiers (e.g., reference codes, referred to as refcodes), which can be ambiguous to less experienced personnel (e.g., developers, testers, and field technicians). While personnel with more experience are, sometimes, quickly able to identify a problem from personal knowledge of past error reporting and resolution, and are able to resolve a problem based on this human learned historical knowledge, personnel with less experience are often unable to do this, and undertake additional research to understand what the reference code refers to, what similar problems in the past encountered were, and how they might be able to solve such a problem. Further, field technicians analyzing problems often have to contact a second level of support to identify how to resolve a problem, which is wasteful. Generally, the longer it takes to resolve a problem the more expensive it becomes, in terms of both resources and costs.

In an embodiment, problem analysis techniques can be updated over time. For example, new software code can be used for problem analysis, or additional relevant information can be identified for retrieval from a subject computing system (e.g., a computing system undergoing a problem). These can be updated, in an embodiment, based on experience solving problems over time (e.g., the problem at issue for a computing system, related problems, or similar problems).

In one embodiment, problem analysis updates are made using patches. For example, a new version of software code can be applied to a subject machine, in the form of a software patch, and the patch can include updated problem analysis information. But customer machine updates are generally not predictable and are on individual cadences. This means that in the case of newly identified updates for problem analysis, the subject machine may not be at a current code level in order to utilize this newly learned knowledge, resulting in missing rules and knowledge because the not-yet-updated machine does not have the new patch.

One or more embodiments discussed below relate to a system that allows for immediate feedback on the rules and knowledge that a computing system experiencing problems uses for problem analysis (e.g., instant feedback any time a problem is called home to a source vendor or administration system). A given refcode identifying a problem can be correlated with problem analysis rules and knowledge associations (e.g., using a problem history database). These updates rules and knowledge can then be updated when the subject machine contacts a home system (e.g., a source vendor or administration system).

In an embodiment, rather than waiting for the customer to apply a patch, every time a problem is called home, the system checks the rules and knowledge known for analyzing the problem. For example, the rules and knowledge associated with a given problem (e.g., identified by a refcode) can be maintained in a centralized location, such as the cloud. The updated rules and knowledge can then be immediately distributed to every machine within the customer network. The rules and knowledge information can be compared to the version of the information currently available on a subject system. If the centralized version is newer than the version available on the subject system, the problem data can be updated by transferring rules and knowledge to the subject system. This updated information can then be used to more accurately, and efficiently, analyze the problem (e.g., by determining how to proceed with problem analysis and recovery). For example, the rules information can include rules for files prioritization and data to call home, error priority rules, call home type, time thresholding and count thresholding, and any other suitable rules. The knowledge information can include a code patch level where a problem was fixed, recovery procedures for the identified problem or similar problems, updated refcode definitions, who to contact for support, whitelisted errors (e.g., errors that do not need resolution or do not need immediate resolution), updates to hardware messages, and a field replaceable unit (FRU) list for a repair action, among other information. The knowledge and rules are discussed further, below, with regard to FIG. 4.

In an embodiment, one or more of these improvements allow for customer computing systems to have a more accurate collection of data and errors, without having to apply a patch. This allows for more accurate, and efficient, analysis and resolution of problems with the computing system. Further, it can prevent data loss and increase the operating efficiency of customer computing systems. Updated problem analysis data can be used to allow a customer computing system to automatically (e.g., without human intervention) analyze problems, and even resolve problems.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as a problem analysis service 152, which facilitates problem analysis updates to machines within a computing network. In addition to problem analysis service 152, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 152, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 152 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 152 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
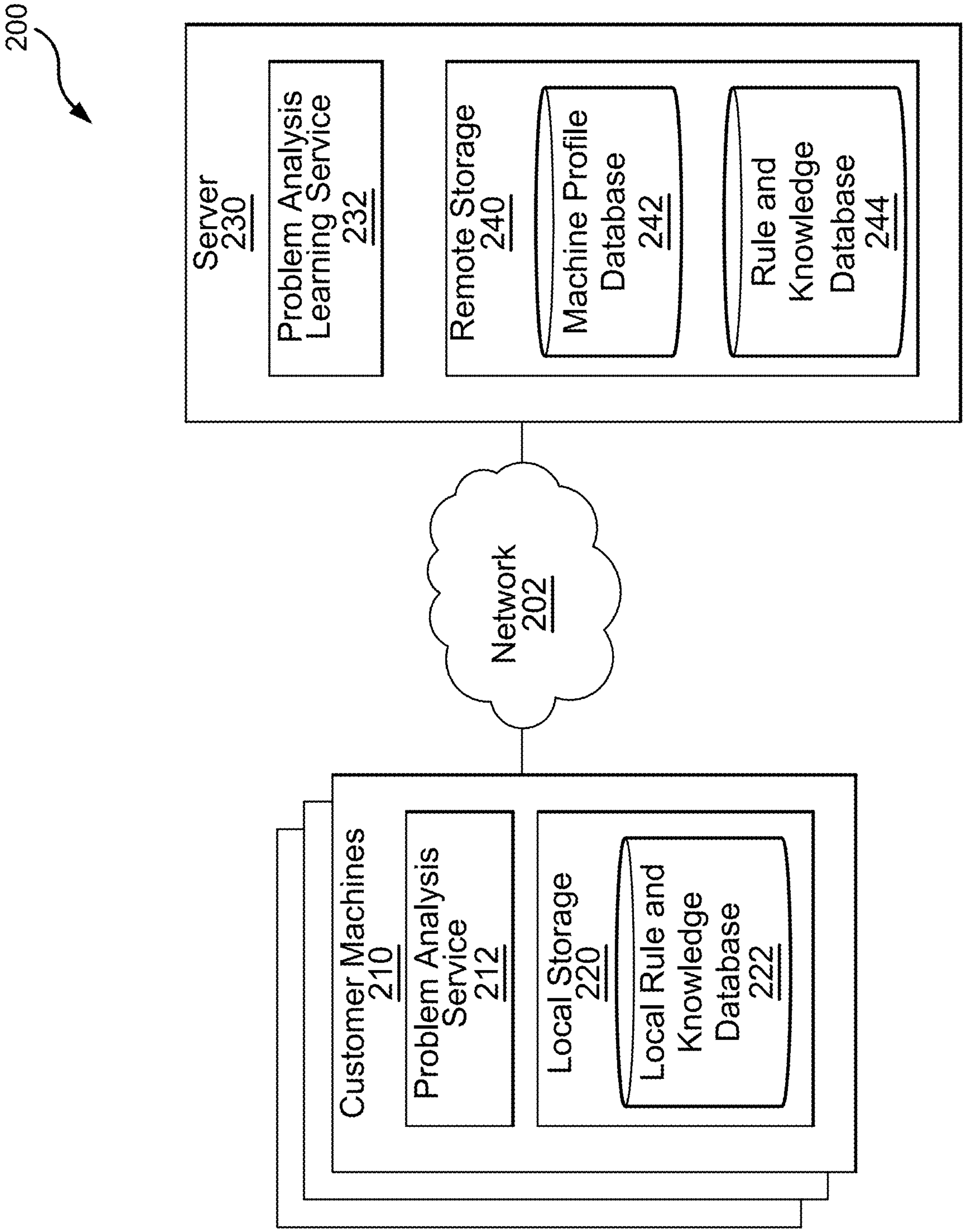
FIG. 2 illustrates a network diagram for problem analysis updates to machines within a computing network, according to one embodiment.

FIG. 2 illustrates a network diagram for problem analysis updates to machines within a computing network, according to one embodiment. In an embodiment, a computing environment 200 includes one or more customer machines 210 connected to one or more servers 230 using a communication network 202. In an embodiment, the customer machines 210 relate to computing systems that experience a problem. While the customer machines 210 can be used by customers of a central vendor, this is merely an example. The customer machines 210 can be any suitable computing devices capable of reporting problem (e.g., a bug, crash, error, or other problem), and include mainframes, laptops, desktops, gaming consoles, smartphones, tablets, wearable devices, Internet of Things (IoT) devices, or any other suitable computing systems).

In an embodiment, the network 202 connects the one or more customer machines 210 to the one or more servers 230. The network 202 can be any suitable wired or wireless network, including a LAN, WAN, cellular network, or any other suitable network, as discussed above in relation to the WAN 102 illustrated in FIG. 1. As noted above, while the WAN 102 is labeled as a WAN, this is merely an example.

In an embodiment, each of the customer machines 210 includes a problem analysis service 212, and a local storage 220 with a local rule and knowledge database 222. For example, the problem analysis service 212 can correspond with the problem analysis service 152 illustrated in FIG. 1, and can facilitate problem analysis updates to machines (e.g., the customer machines 210) within a computing network (e.g., the network 202). In an embodiment, the problem analysis service 212 facilitates any combination of diagnosing a problem, collecting data for the problem, and identifying how to remediate the problem (e.g., who or what to contact to remediate the problem, or how to remediate the problem automatically). Further, in an embodiment, the local rule and knowledge database 222 contains the rules and knowledge used by the problem analysis service to facilitate problem analysis.

In an embodiment, the server 230 maintains a repository (e.g., a global repository) of problem analysis rules and knowledge, for use in problem analysis for the customer machines 210. For example, the server 230 can include suitable web server functionality, or any other suitable server functionality, and can be capable of running container services (e.g., docker services), server applications, or any other suitable software services or applications. Further, as discussed above in relation to FIG. 1, the server 230 can operate in a cloud environment (e.g., as one or more compute nodes in a cloud environment).

In an embodiment, a problem analysis learning service 232 facilitates analyzing data reports by computing systems experience problems (e.g., the customer machines 210), and updating the problem analysis rules and knowledge at these computing systems. For example, the problem analysis learning service 232 can also correspond with the problem analysis service 152 illustrated in FIG. 1. That is, the problem analysis service 152 can correspond with the problem analysis service 212 on the customer machines 210, the problem analysis learning service 232 on the server 230, or any aspects of both.

Figure 3:
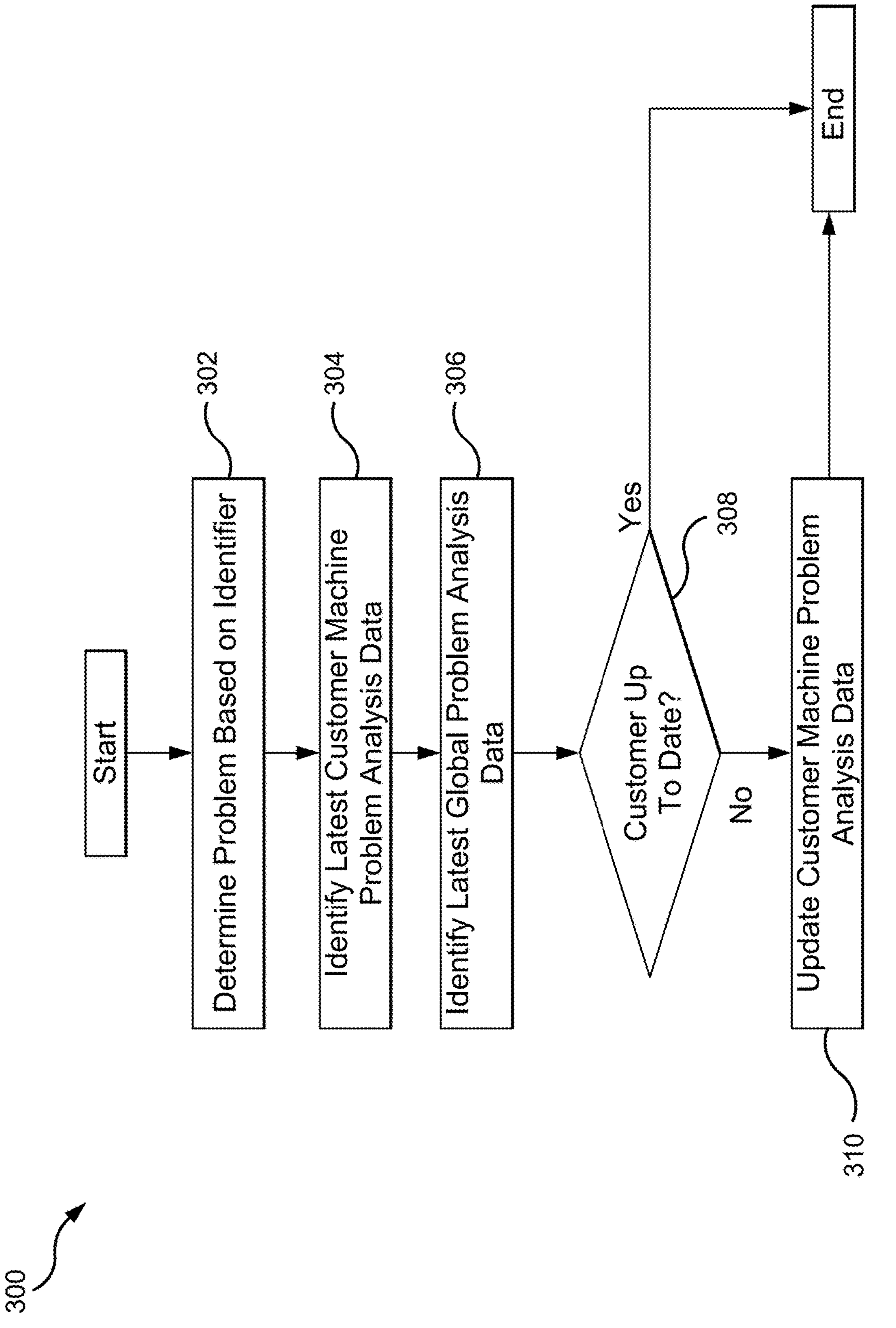
FIG. 3 illustrates a flowchart for problem analysis updates to machines within a computing network, according to one embodiment.

In an embodiment, the server 230 includes a remote storage 240 with a machine profile database 242 and a rule and knowledge database 244. For example, the machine profile database 242 can include information about the customer machines 210, including the current version of the rules and knowledge maintained on each customer machine 210. As another example, the rule and knowledge database 244 includes the set of rules and knowledge used to conduct problem analysis (e.g., global rules and knowledge). In an embodiment, as the problem analysis learning service 232 learns updates to the rules and knowledge, it modifies them in database 244. Further, the problem analysis learning service 232 can check the version of rules and knowledge found on the machines contained in profile database 242, and pushes the new set of rules and knowledge out to the machines that do not have the current changes FIG. 3 illustrates a flowchart 300 for problem analysis updates to machines within a computing network, according to one embodiment. At block 302, a problem analysis service (e.g., the problem analysis learning service 232 illustrated in FIG. 2) determines a problem based on an identifier (e.g., a refcode). In an embodiment, a computing system experiencing a problem (e.g., the customer machines 210) contacts a remote system after experiencing a problem (e.g., the server 230). The computing system experiencing the problem can provide an identifier (e.g., a refcode) relating to the problem, and the problem analysis service can receive that refcode and identify a problem based on that refcode. Association of refcodes with problem analysis data is discussed further in U.S. patent application Ser. No. 18/507,196, which is hereby incorporated by reference for its discussion of associating refcodes with problem analysis data.

At block 304, the problem analysis service identifies the latest customer machine problem analysis data. For example, the problem analysis service can use the machine profile database 242 illustrated in FIG. 2 to identify the latest version of problem analysis rules, knowledge and behaviors on the customer machine. In one embodiment, problem analysis rules, knowledge and behaviors are collectively associated with version information (e.g., one or more version identifiers). Alternatively, or in addition, the different aspects of the problem analysis rules, knowledge and behaviors are associated with different version information. For example, problem analysis rules can be associated with one version identifier, while problem analysis knowledge and behaviors can be associated with a different version identifier. This is merely an example.

At block 306, the problem analysis service identifies the latest global problem analysis data. For example, the problem analysis service can use the rule and knowledge database 244 illustrated in FIG. 2 to identify the latest global knowledge and behaviors available. As above for block 306, in one embodiment, problem analysis rules, knowledge and behaviors are collectively associated with version information (e.g., one or more version identifiers). Alternatively, or in addition, the different aspects of the problem analysis rules, knowledge and behaviors are associated with different version information. This is merely an example.

At block 308, the problem analysis service determines whether the customer is up to date. In an embodiment, the problem analysis service compares one or more version identifiers associated with customer machine problem analysis data (e.g., described above in relation to block 304) with one or more version identifiers associated with global problem analysis data (e.g., described above in relation to block 306). If the customer machine is up to date (e.g., the version identifiers for the global problem analysis data match the version identifiers for the customer machine problem analysis data), the flow ends. If the customer machine is not up to date (e.g., one or more of the version identifiers for the global problem analysis data exceed the corresponding version identifiers for the customer machine problem analysis data) the flow proceeds to block 310.

In an embodiment, comparing version identifiers is merely one way to identify whether a customer machine is up to date. Alternatively, or in addition, the problem analysis service can compare problem analysis data directly, can compare a characteristic of the problem analysis data (e.g., a size on disk, a hash value, a digital signature, or any other suitable characteristic), or can use any other suitable technique.

At block 310, the problem analysis service updates customer machine problem analysis data. For example, the problem analysis service can transmit updated problem analysis rules, knowledge, and behavior data from a global repository (e.g., the rules and knowledge database 244 illustrated in FIG. 2) to a customer machine (e.g., for storage in a local rule and knowledge database 222 illustrated in FIG. 2. This is discussed further, below, with regard to FIG. 4.

Figure 4:
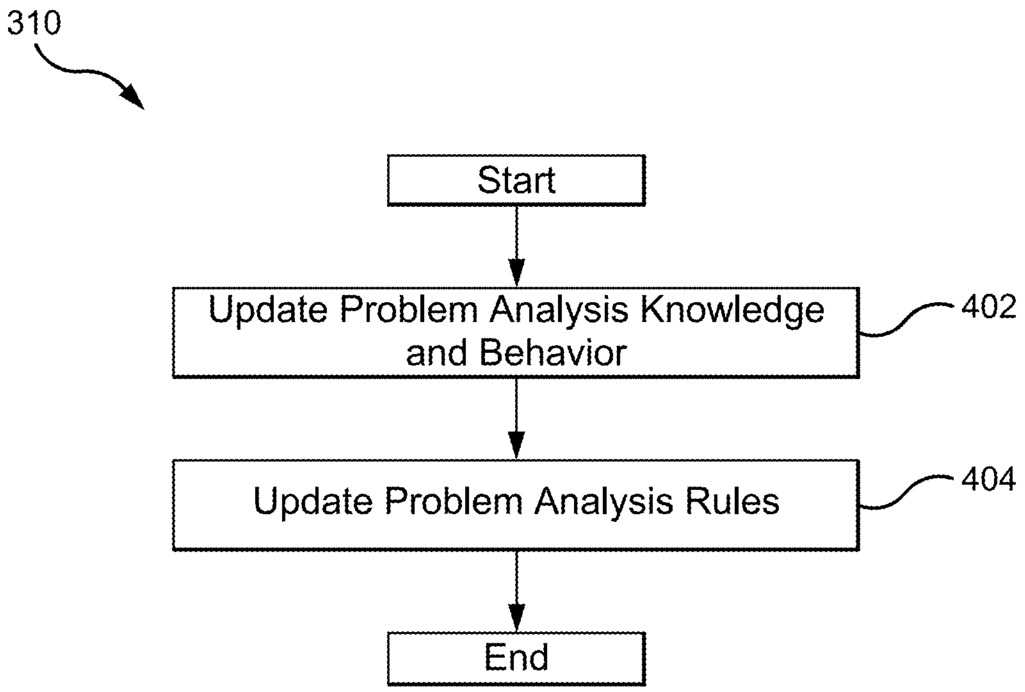
FIG. 4 illustrates a flowchart for updating a customer machine for problem analysis, according to one embodiment.

FIG. 4 illustrates a flowchart for updating a customer machine for problem analysis, according to one embodiment. In an embodiment, FIG. 4 corresponds with block 310 illustrated in FIG. 3. At block 402, a problem analysis service (e.g., the problem analysis learning service 232 illustrated in FIG. 2) updates problem analysis knowledge and behaviors (e.g., from a global repository to a customer machine). In an embodiment, similar historical errors can be used to immediately update problem data. This can be based on a similar defect comment history, or an existing problem database, among other sources.

In an embodiment, the problem analysis knowledge and behaviors can include knowledge for technicians attempting to fix a problem (e.g., a problem associated with a given refcode). For example, the problem analysis knowledge can include a code patch level where a problem was fixed, recovery procedures for the identified problem or similar problems, updated refcode definitions, who to contact for support, whitelisted errors (e.g., errors that do not need resolution or do not need immediate resolution), updates to hardware messages, and an FRU list for a repair action. In an embodiment, knowledge can be associated with a given refcode based on ranking conversations (e.g., problem analysis conversations) based on relevance. Relevancy can be determined using information retrieval processes (e.g., a calculation of cosine similarity), recency, or any other suitable technique.

At block 404, the problem analysis service updates problem analysis rules. In an embodiment problem analysis rules are used for analyzing a problem on a client machine. Further, problem analysis rules can be updated over time (e.g., based on similar historical errors or solutions to a given error).

The problem analysis rules can include a wide variety of suitable rules. For example, the problem analysis rules can include files prioritization and data to call home. In an embodiment, this can be used to govern which files, in what priority, are sent from a client machine to a remote location for problem analysis (e.g., debugging). As another example, the problem analysis rules can include data limits (e.g., how much data to send for problem analysis), problem analysis window length (e.g., describing a window duration for cascading or secondary errors), call home error type (e.g., which error types should be sent for remote debugging), and duplicate errors (e.g., whether to send problem information for duplicate problems). These are merely examples, and the problem analysis rules can include any suitable rules.

In an embodiment, the problem analysis rules can further relate to error priority. For example, error priority can be the priority of the error during the problem analysis. When analysis is completed, the error with the highest priority is the one for which problem information is transmitted for analysis. In an embodiment, having an inaccurate error priority can result in transmitting the wrong debug data and sending the wrong parts for repair. In an embodiment, if two refcode errors are identified as identical, similar enough, or potentially related, the priorities can be adjusted based on adjusted priorities for similar defects, or indications about adjusted priorities indicated in comments (e.g., similar defect comments).

Further, the problem analysis rules can include a type of call home (e.g., silent, visible to client, product engineering involvement, service dispatch, or any other suitable type). In an embodiment, if two refcode errors are identified as identical, similar enough, or potentially related, the type of call home is adjusted based on whether product engineering was forced to get involved, if FRUs needed to be sent out, and changes in comments (e.g., similar defect comments).

As another example, the problem analysis rules can include time thresholding and count thresholding. In an embodiment, a time threshold relates to how much time to wait before allowing a duplicate error reference code (e.g., a refcode) to be called home since the last time it was called home. Any duplicate refcodes within this time period will be ignored. This prevents repeated calling home the same problems until they are resolved. In an embodiment, a count threshold relates to number of times an error is seen before the problem analysis service sends remote problem information (e.g., calls home). Further, in an embodiment the problem analysis service also takes into account machine state "noisiness," with the higher the number of errors occurring on the machine resulting in a larger threshold to suppress that refcode-even more, the higher the number of similar errors occurring results in increasing the time or count threshold.

In an embodiment, if two refcode errors are identified as identical, similar enough, or potentially related (e.g., based on vector comparisons), the problem analysis service can introduce a cross-error threshold to correlate these errors. The cross-error threshold can be a threshold for errors deemed similar enough. For example, if two refcode errors are identified as identical, similar enough, or potentially related, the type of call home can be adjusted based on whether an engineer was forced to get involved, whether FRUs needed to be sent out, and changes to this type in the similar defect comments. As another example, if two refcode errors are identified as identical, similar enough, or potentially related, priorities can be adjusted based on adjusted priorities for similar defects, or indications about adjusted priorities indicated in the similar defect comments.

Figure 5:
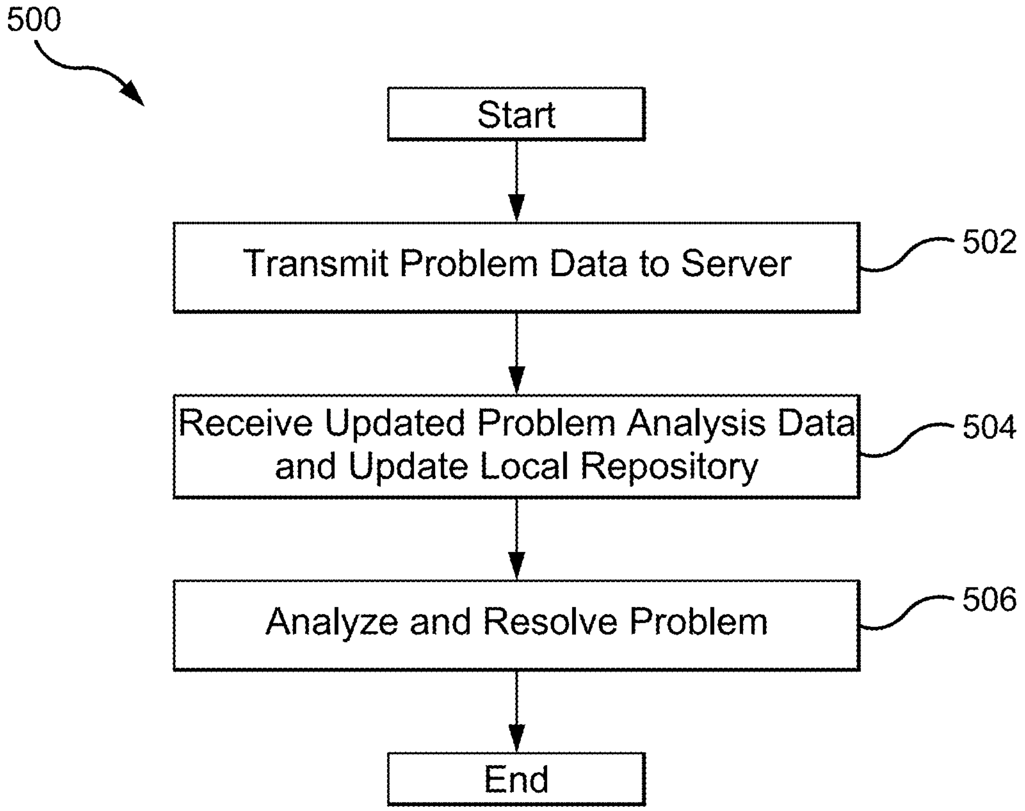
FIG. 5 illustrates a flowchart for customer machine problem analysis updates, according to one embodiment.

FIG. 5 illustrates a flowchart 500 for customer machine problem analysis updates, according to one embodiment. In an embodiment, FIG. 3, above, corresponds to server activities for problem analysis updates to machines within a computing network, according to one embodiment, while FIG. 5 corresponds to customer machine customer machine problem analysis updates, according to one embodiment.

At block 502, a problem analysis service (e.g., the problem analysis service 212 illustrated in FIG. 2) transmits problem data to a server. In an embodiment, this can be referred to as a call home. For example, the problem analysis service can transmit a refcode identifying the problem, version data reflecting the existing version of problem analysis data on the customer machine, or any other suitable data. This is merely an example, and the problem analysis service can transmit any suitable data.

At block 504 the problem analysis service receives updated problem analysis data and updates the local repository. For example, the server can determine that one or more aspects of the problem analysis data (e.g., knowledge, behavior data, and rules) are more up to date on the server than the customer machine. The server can then transmit the updated data, and the customer machine can store the data in a suitable electronic repository (e.g., the local rule and knowledge database 222 illustrated in FIG. 2).

At block 506, the problem analysis service analyzes and resolves the problem. For example, the problem analysis service can use the updated problem analysis rules, knowledge, and behavior data to conduct problem analysis (e.g., as discussed above in relation to FIG. 4). This problem analysis can be automated, without human intervention, or can be conducted in concert with a human engineer or technician. Further, where applicable, the problem analysis service can use the problem analysis data to resolve the problem.

While the foregoing is directed to embodiments of the present invention, other and further embodiments of the invention may be devised without departing from the basic scope thereof, and the scope thereof is determined by the claims that follow.

What is claimed is:

1. A method comprising:

receiving, at a remote server, an identifier from a computing system, wherein the identifier identifies a computing system problem that has occurred at the computing system;

evaluating the computing system problem, based on the identifier and global problem analysis rules and knowledge data of a remote server database at the remote server, to identify related and similar errors;

identifying, at the remote server based on the identified related and similar errors, second problem analysis data relating to the computing system problem;

determining, at the remote server, that first problem analysis data, relating to the computing system problem and accessible at the computing system, is out of date compared with the second problem analysis data at the remote server, wherein the determining comprises checking a remote storage database to determine a version of the first problem analysis data of the computing system; and transmitting based on the remote server being contacted by the computing system with the identifier and the remote server determining that the first problem analysis data is out of date, the second problem analysis data from the remote server to the computing system, wherein the computing system is configured to receive the second problem analysis data and update a local repository of problem analysis rules and knowledge data, and automatically analyze the second problem analysis data to resolve the computing system problem.

2. The method of claim 1, wherein the second problem analysis data comprises one or more problem analysis rules used to resolve the computing system problem, and wherein the one or more problem analysis rules are used by the computing system to identify a solution to the computing system problem.

3. The method of claim 2, wherein the one or more problem analysis rules comprise at least one of: (i) an error priority rule, (ii) a call-home rule relating to transmission between the computing system and the remote server, (iii) a time thresholding rule relating to a duration to ignore duplicate problem identifiers, or (iv) a count threshold rule relating to a number of times an error occurs before undertaking a transmission from the computing system to the remote server.

4. The method of claim 3, wherein the one or more problem analysis rules comprise the error priority rule.

5. The method of claim 3, wherein the one or more problem analysis rules comprise the call-home rule.

6. The method of claim 3, wherein the one or more problem analysis rules comprise the time thresholding rule.

7. The method of claim 3, wherein the one or more problem analysis rules comprise the count threshold rule.

8. The method of claim 1, wherein the second problem analysis data comprises problem analysis knowledge, and wherein the problem analysis knowledge is used by the computing system to identify a solution to the computing system problem.

9. The method of claim 8, wherein the problem analysis knowledge relates to at least one of: (i) duplicate error knowledge, (ii) hardware update knowledge, (iii) code patch level where a problem was fixed knowledge, (iv) field replaceable unit (FRU) knowledge, or (v) whitelisted error knowledge.

10. The method of claim 1, wherein the evaluating the computing system problem comprises:

determining that the computing system problem is the same error as a second, historical problem, based on comparing a similarity between the computing system problem and the second historical problem and using a cross-error threshold to update the second problem analysis data at the remote server.

11. A non-transitory computer program product comprising:

one or more non-transitory computer readable media containing, in any combination, computer program code that, when executed by operation of any combination of one or more processors, performs operations comprising:

receiving, at a remote server, an identifier from a computing system, wherein the identifier identifies a computing system problem that has occurred at the computing system;

evaluating the computing system problem, based on the identifier and global problem analysis rules and knowledge data of a remote server database at the remote server, to identify related and similar errors:

identifying, at the remote server based on the identified related and similar errors, second problem analysis data relating to the computing system problem;

determining, at the remote server, that first problem analysis data, relating to the computing system problem and accessible at the computing system, is out of date compared with the second problem analysis data at the remote server, wherein the determining comprises checking a remote storage database to determine a version of the first problem analysis data of the computing system; and transmitting, based on the remote server being contacted by the computing system with the identifier and the remote server determining that the first problem analysis data is out of date, the second problem analysis data from the remote server to the computing system, wherein the computing system is configured to receive the second problem analysis data and update a local repository of problem analysis rules and knowledge data, and automatically analyze the second problem analysis data to resolve the computing system problem.

12. The non-transitory computer program product of claim 11, wherein the second problem analysis data comprises one or more problem analysis rules used to resolve the computing system problem, and wherein the one or more problem analysis rules are used by the computing system to identify a solution to the computing system problem.

13. The non-transitory computer program product of claim 12, wherein the one or more problem analysis rules comprise at least one of: (i) an error priority rule, (ii) a call-home rule relating to transmission between the computing system and the remote server, (iii) a time thresholding rule relating to a duration to ignore duplicate problem identifiers, or (iv) a count threshold rule relating to a number of times an error occurs before undertaking a transmission from the computing system to the remote server.

14. The non-transitory computer program product of claim 11, wherein the second problem analysis data comprises problem analysis knowledge, and wherein the problem analysis knowledge is used by the computing system to identify a solution to the computing system problem.

15. The non-transitory computer program product of claim 14, wherein the problem analysis knowledge relates to at least one of: (i) duplicate error knowledge, (ii) hardware update knowledge, (iii) code patch level where a problem was fixed knowledge, (iv) field replaceable unit (FRU) knowledge, or (v) whitelisted error knowledge.

16. A system comprising:

one or more processors; and one or more memories storing a program, which, when executed on any combination of the one or more processors, performs operations, the operations comprising:

receiving, at a remote server, an identifier from a computing system, wherein the identifier identifies a computing system problem that has occurred at the computing system;

evaluating the computing system problem, based on the identifier and global problem analysis rules and knowledge data of a remote server database at the remote server, to identify related and similar errors;

identifying, at the remote server based on the identified related and similar errors, second problem analysis data relating to the computing system problem;

determining, at the remote server, that first problem analysis data, relating to the computing system problem and accessible at the computing system, is out of date compared with the second problem analysis data at the remote server, wherein the determining comprises checking a remote storage database to determine a version of the first problem analysis data of the computing system; and transmitting, based on the remote server being contacted by the computing system with the identifier and the remote server determining that the first problem analysis data is out of date, the second problem analysis data from the remote server to the computing system, wherein the computing system is configured to receive the second problem analysis data and update a local repository of problem analysis rules and knowledge data, and automatically analyze the second problem analysis data to resolve the computing system problem.

17. The system of claim 16, wherein the second problem analysis data comprises one or more problem analysis rules used to resolve the computing system problem, and wherein the one or more problem analysis rules are used by the computing system to identify a solution to the computing system problem.

18. The system of claim 17, wherein the one or more problem analysis rules comprise at least one of: (i) an error priority rule, (ii) a call-home rule relating to transmission between the computing system and the remote server, (iii) a time thresholding rule relating to a duration ignore duplicate problem identifiers, or (iv) a count threshold rule relating to a number of times an error occurs before undertaking a transmission from the computing system to the remote server.

19. The system of claim 16, wherein the second problem analysis data comprises problem analysis knowledge, and wherein the problem analysis knowledge is used by the computing system to identify a solution to the computing system problem.

20. The system of claim 19, wherein the problem analysis knowledge relates to at least one of: (i) duplicate error knowledge, (ii) hardware update knowledge, (iii) code patch level where a problem was fixed knowledge, (iv) field replaceable unit (FRU) knowledge, or (v) whitelisted error knowledge.

* * * * *